(12) United States Patent
Dunlop et al.

(10) Patent No.: US 12,002,116 B2
(45) Date of Patent: Jun. 4, 2024

(54) SYSTEMS AND METHODS FOR ASSESSMENT AND VISUALIZATION OF EXCESS AND OBSOLETION IN SUPPLY CHAIN MANAGEMENT SYSTEM

(71) Applicant: JABIL INC., St. Petersburg, FL (US)

(72) Inventors: Erin Dunlop, St. Peterburg, FL (US); Jennifer Foster, St. Petersburg, FL (US); Jeff Miller, St. Petersburg, FL (US); Simon Yannopoulos, St. Petersburg, FL (US); Andrew Joyner, St. Petersburg, FL (US); Jennifer Frey, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 0 days.

(21) Appl. No.: 16/790,473

(22) Filed: Feb. 13, 2020

(65) Prior Publication Data
US 2021/0256633 A1 Aug. 19, 2021

(51) Int. Cl.
*G06Q 50/04* (2012.01)
*G06F 16/26* (2019.01)
(Continued)

(52) U.S. Cl.
CPC ............ *G06Q 50/04* (2013.01); *G06F 16/26* (2019.01); *G06Q 10/06315* (2013.01); *G06Q 10/0875* (2013.01)

(58) Field of Classification Search
None
See application file for complete search history.

(56) References Cited

U.S. PATENT DOCUMENTS

| | | | |
|---|---|---|---|
| 2003/0018546 A1* | 1/2003 | Ayala | G06Q 10/06 705/28 |
| 2003/0033179 A1* | 2/2003 | Katz | G06Q 10/0631 705/7.12 |

(Continued)

OTHER PUBLICATIONS

Persona, Alessandro, Andrea Grassi, and M. Catena. "Consignment stock of inventories in the presence of obsolescence." International Journal of Production Research 43.23 (2005): 4969-4988 (Year: 2005).*

(Continued)

*Primary Examiner* — Darlene Garcia-Guerra
(74) *Attorney, Agent, or Firm* — Riverside Law LLP

(57) ABSTRACT

An apparatus, system and method for an excess and obsoletion application and engine resident in a supply chain management system. Included are at least one rule set; at least one database of distinct customers, wherein the at least one database has relationally accessible in accordance with ones of the distinct customer entries in the at least one database at least the manufactured product for the distinct customer correspondent; a full parts and materials list correspondent to the manufacturing of the manufactured product; definitions from the contract for each of the manufactured products and each of the distinct customer regarding when ones of the parts and the materials become excess or obsolete; and a graphical user interface (GUI) suitable to provide access to details of at least the manufactured product, the full parts and materials list, and the definitions, such that a claim for excess or obsoletion may be made through the GUI.

18 Claims, 18 Drawing Sheets

(51) Int. Cl.
  *G06Q 10/0631* (2023.01)
  *G06Q 10/0875* (2023.01)

(56) References Cited

U.S. PATENT DOCUMENTS

| | | | | |
|---|---|---|---|---|
| 2003/0126043 | A1* | 7/2003 | Chen | G06Q 10/087 |
| | | | | 705/28 |
| 2006/0195562 | A1* | 8/2006 | Eisenson | G06Q 10/087 |
| | | | | 709/223 |
| 2007/0124009 | A1* | 5/2007 | Bradley | G06Q 10/087 |
| | | | | 700/99 |
| 2009/0055270 | A1* | 2/2009 | Magdon-Ismail | G06F 16/957 |
| | | | | 705/14.27 |
| 2009/0150663 | A1* | 6/2009 | Perry | G06Q 10/06 |
| | | | | 713/150 |
| 2010/0125489 | A1* | 5/2010 | Surendra | G06Q 10/06 |
| | | | | 705/22 |
| 2010/0287011 | A1* | 11/2010 | Muchkaev | A63F 13/792 |
| | | | | 706/45 |
| 2014/0195396 | A1* | 7/2014 | Bhakta | G06Q 40/02 |
| | | | | 705/35 |
| 2015/0066569 | A1* | 3/2015 | Ervolina | G06Q 10/06315 |
| | | | | 705/7.25 |
| 2017/0039500 | A1* | 2/2017 | Leidner | G06Q 10/0833 |
| 2017/0270585 | A1* | 9/2017 | Lewis | G06Q 30/0222 |
| 2018/0012166 | A1* | 1/2018 | Devadas | G06Q 10/06315 |

OTHER PUBLICATIONS

Ghiassi, Manoochehr, and C. O. S. I. M. O. Spera. "Defining the Internet-based supply chain system for mass customized markets." Computers & Industrial Engineering 45.1 (2003): 17-41 (Year: 2003).*

Sandborn, Peter. "Design for obsolescence risk management." Procedia cirp 11 (2013): 15-22 (Year: 2013).*

Huang, Samuel H., Sunil K. Sheoran, and Harshal Keskar. "Computer-assisted supply chain configuration based on supply chain operations reference (SCOR) model." Computers & industrial engineering 48.2 (2005): 377-394 (Year: 2005).*

Tang, Ou, and S. Nurmaya Musa. "Identifying risk issues and research advancements in supply chain risk management." International journal of production economics 133.1 (2011): 25-34 (Year: 2011).*

* cited by examiner

702

| CLAIM SUMMARY |
|---|

Claimable Amount: $6,012,271

Excluded: —

Total: $6,012,271

Claimable Parts
Included: 1,427

Excluded Partial: 0

Excluded: 0

Comment: + Add

Claim R56

| PART NUMBER | CUSTOMER PART N... |
|---|---|
| TX1134357-00-A | 1521390-00-A |
| TX1521390-00-A | 1521390-00-A |
| TX1003730-00-A | 1003730-00-A |
| TX1003730-00-A | 1003730-00-A |
| TX1003730-00-A | 1003730-00-A |
| TX1003730-00-A | 1003730-00-A |
| TX1003730-00-A | 1003730-00-A |
| TX1003730-00-A | 1003730-00-A |
| TX1003730-00-A | 1003730-00-A |
| TX1003730-00-A | 1003730-00-A |

CLAIMABLE PARTS 802

Search...

PART NUMBER

| Contains ▼ |
| Equals |
| Not equal |
| Starts with |
| Ends with |
| Contains |
| Not contains |

TX1032255-00-A-1
TX1032255-00-A-1
TX-POLYBAG-03
TX-POLYBAG-03

FIG.9A

CLAIMABLE PARTS 802

Search...

PART NUMBER

Filter...

☑ Part Number
☑ Customer Part Number
☑ Aging Days
☑ Part Description
☑ Status
☑ Inventory Classification
☑ Quantity
☑ Sell Price USD
☑ Value USD
☑ Standard Price USD
☑ Reason TX1032255-00-A-1 ☑
TX1032255-00-A-1 ☑
TX-POLYBAG-03 ☑
TX-POLYBAG-03 ☑
TX1026634-00-A ☑
TX1026634-00-A ☑
TX1026634-00-A ☑

FIG.9B

SYSTEMS AND METHODS FOR ASSESSMENT AND VISUALIZATION OF EXCESS AND OBSOLETION IN SUPPLY CHAIN MANAGEMENT SYSTEM

RELATED APPLICATIONS

This application claims priority to, is related to, and incorporates by reference, U.S. provisional application No. 62/509,675, filed May 22, 2017, entitled "Systems and Methods for Assessment and Visualization of Supply Chain Management System Data"; U.S. provisional application No. 62/509,665, filed May 22, 2017, entitled "Systems and Methods for Interfaces to a Supply Chain Management System"; U.S. provisional application No. 62/509,660, filed May 22, 2017, entitled "Systems and Methods for Risk Processing of Supply Chain Management System Data"; U.S. provisional application No. 62/509,669, filed May 22, 2017, entitled "Systems and Methods Optimized Design of a Supply Chain"; U.S. provisional application No. 62/509,653, filed May 22, 2017, entitled Systems and Methods for Providing Diagnostics for a Supply Chain; U.S. patent application Ser. No. 14/523,642, filed Oct. 24, 2014, to Valentine, et al., entitled "Systems and Methods for Risk Processing and Visualization of Supply Chain Management System Data," which claims priority to U.S. provisional patent application Ser. No. 61/895,636, to Valentine, et al., entitled "Power Supply With Balanced Current Sharing," filed Oct. 28, 2013, U.S. provisional patent application Ser. No. 61/895,665, to Joyner et al., entitled "System and Method for Managing Supply Chain Risk," filed Oct. 25, 2013, and U.S. provisional patent application Ser. No. 61/896,251 to McLellan et al., entitled "Method for Identifying and Presenting Risk Mitigation Opportunities in a Supply Chain," filed Oct. 28, 2013. Each of these is incorporated by reference in their respective entireties herein.

BACKGROUND

Field of the Disclosure

The present disclosure relates to supply chain management (SCM) system processing. More specifically, the present disclosure is related to processing SCM data to reduce cost, optimize data processing and networked communications, improve flexibility, and identify and mitigate excess and obsoletion of parts in a supply chain.

Background of the Disclosure

Supply chains have become increasingly complex, and product companies are faced with numerous challenges such as globalization, shortening product lifecycles, high mix product offerings and countless supply chain procurement models. In addition, challenging economic conditions have placed additional pressure, particularly on contract manufacturers, to reduce cost to maximize margin or profit.

Rather than a data- and algorithm-centric supply chain analysis discussed above, supply chains, and the excess and obsoletion of the parts used therein, is instead most often an exclusively or largely manual process. Thus, conventional systems are needlessly complicated and somewhat disorganized in that multiple layers of classifications are utilized and, too often, such systems are simply reactive and never proactive. Further, these conventional systems fail to provide tools to aid in the assessment of aspects of a supply chain, including excess and obsoletion.

More specifically and as discussed throughout, it is typically the case in contract manufacturing that the contract manufacturer purchases parts and materials for use in the contracted manufacturing process. As such, the subject manufacturing contract often includes forecasting by the customer (of the contract manufacturer), wherein the forecasting may indicate a number of manufactured items and/or a timeframe of manufactured items required by the contract, and may thus directly or indirectly indicate the numbers of parts and materials necessary to manufacture the required number of manufactured items in the given timeframe.

However, parts and materials ordered do not simply appear instantaneously at the contract manufacturer, but rather are subject to varying lead times, delivery times, reorder times, and the like. Moreover, it is frequent that customer forecasts may change over the course of a manufacturing contract, and that these changes may occur both at predefined and non-predefined time frames per the contract. As such, it is often the case that by the time a parts or materials order arrives at the contract manufacturer, the number of parts or materials ordered may no longer needed by the contract manufacturer to meet the changed demand experienced by the customer. Further, it is also typical that, to the extent a parts or materials order from a provider is not modified within a certain time frame of the making of the order, the parts and materials cannot be returned by, nor a credit received by, the contract manufacturer. Receipt and inventorying by the contract manufacturer of more parts or materials than are needed in a given timeframe is termed "excess."

In the extreme case of the foregoing circumstance— namely, when a contract manufacturer is in possession of parts or materials that are completely unnecessary given a customer forecast in a given timeframe—is termed "obsoletion". That is, as the aforementioned terms are used throughout, in the known art a change in forecast or need that leads to the possession by the contract manufacturer of too many parts or materials to meet demand constitutes excess, and the possession by a contract manufacturer of parts or materials for which there is zero demand is termed obsoletion.

In accordance with the foregoing, excess and obsolete parts and materials are often defined on a contract-by-contract basis between individual customers and the contract manufacturer in each of the aforementioned manufacturing contracts. Consequently, the definition of excess and obsolete will generally vary, from the standpoint of the contract manufacturer, by individual customer.

Moreover, which party, whether it be the contract manufacturer or the customer, is responsible for excess and obsolete parts and materials within the definitions provided in a given contract, and/or to what extent each party is responsible for the foregoing, also generally varies on a contract-by-contract basis. Although it is often the case that obsoletion is a customer's responsibility, and excess is either a shared responsibility or the responsibility of the contract manufacturer, even this apportionment of responsibilities may vary on a contract-by-contract basis. Yet further, there is, of course, the need for a contract manufacturer to provide quality customer service to its customers; and hence, it may be the case that even excess and obsolete parts and materials within the definitions provided in a contract may prove less than desirable to be subjected to an excess or obsolete claim under the contract by the contract manufacturer.

SUMMARY OF THE DISCLOSURE

Disclosed is an apparatus, system and method for an application and engine resident in a supply chain management system. The apparatus, system and method may include at least one rule set; at least one database of distinct customers contracted to receive manufactured products from the supply chain, wherein the at least one database has relationally accessible in accordance with ones of the distinct customer entries in the at least one database at least: the manufactured product for the distinct customer correspondent to a selected one of the distinct customer database entry; a full parts and materials list correspondent to the manufacturing of the manufactured product; definitions from the contract for each of the manufactured products and each of the distinct customer regarding when ones of the parts and the materials become excess, and when ones of the parts and the materials become obsolete, for that one of the manufactured products and for the distinct customer; and a graphical user interface (GUI) suitable to provide access to details of at least the manufactured product, the full parts and materials list, and the definitions, such that a claim for excess or obsoletion may be made through the GUI against at least one of the parts or at least one of the materials in accordance with application of the definitions by the at least one rule set.

BRIEF DESCRIPTION OF THE DRAWINGS

The present invention is illustrated by way of example and not limitation in the figures of the accompanying drawings, in which like references indicate similar elements and in which:

FIG. 8A illustrates an exemplary GUI;
FIG. 8B illustrates an exemplary GUI;
FIG. 9A illustrates an exemplary GUI;
FIG. 9B illustrates an exemplary GUI.

DETAILED DESCRIPTION

Figure 1:
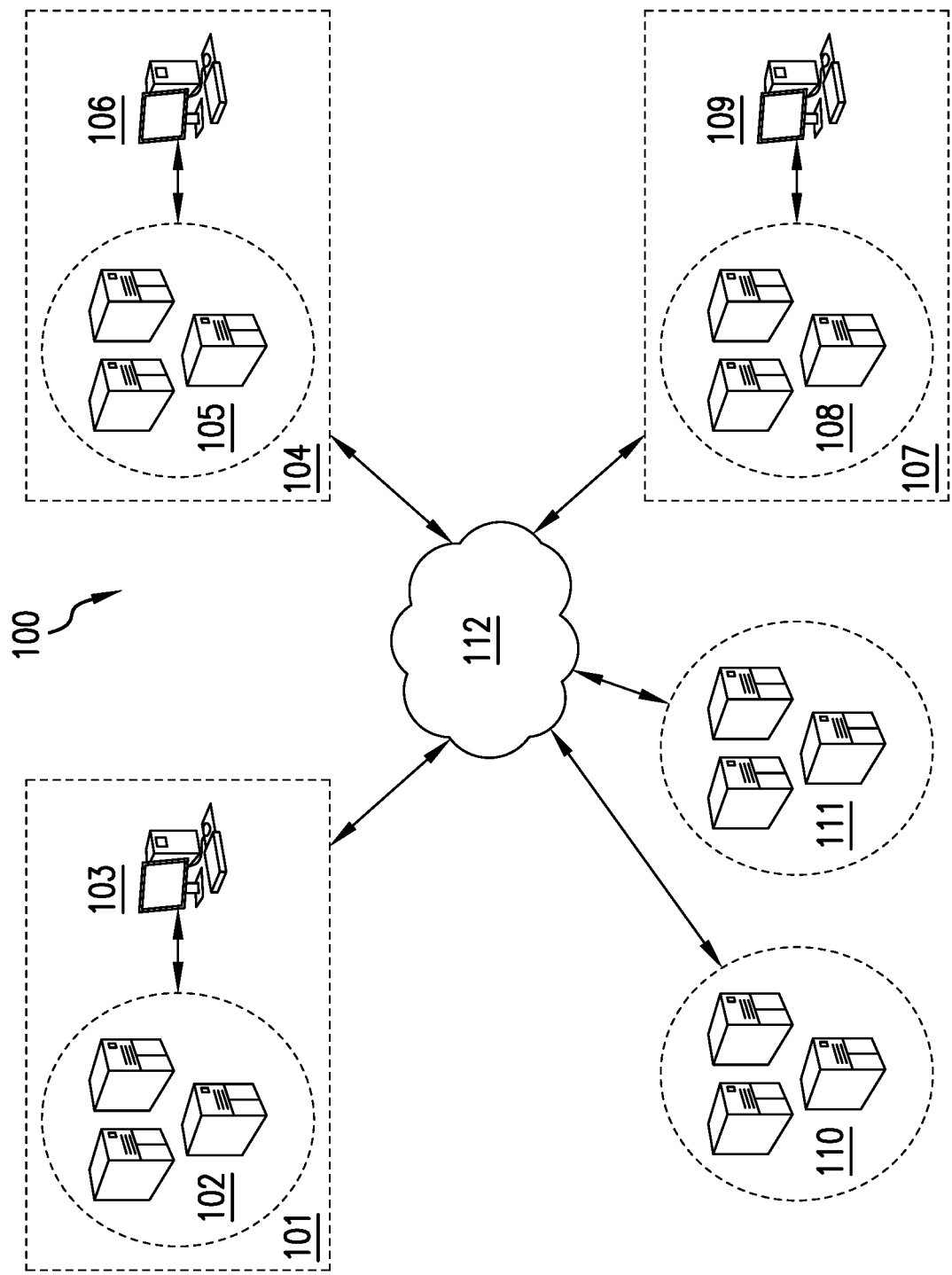
FIG. 1 illustrates a computer system for transmitting and processing data, and particularly supply chain management (SCM) data under an exemplary embodiment.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. However, because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Computer-implemented platforms, engines, systems and methods of use are disclosed herein that provide networked access to a plurality of types of digital content, including but not limited to video, image, text, audio, metadata, algorithms, interactive and document content, and that track, deliver, manipulate, transform and report the accessed content. Described embodiments of these platforms, engines, systems and methods are intended to be exemplary and not limiting. As such, it is contemplated that the herein described systems and methods may be adapted to provide many types of local, server and cloud-based interactions, data exchanges, and the like, and may be extended to provide enhancements and/or additions to the exemplary platforms, engines, systems and methods described. The disclosure is thus intended to include all such extensions.

Furthermore, it will be understood that the terms "module" or "engine", as used herein does not limit the functionality to particular physical modules, but may include any number of tangibly-embodied software and/or hardware components having a transformative effect on at least a portion of a system. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.).

Turning to FIG. 1, an exemplary computer system is disclosed in an embodiment. In this example, computer system 100 is configured as a SCM processing system, wherein primary processing node 101 is configured to contain an SCM platform for processing data from other nodes (104, 107), which will be described in further detail below. In one embodiment, primary node 101 comprises one or more servers 102 operatively coupled to one or more terminals 103. Primary node 101 is communicatively coupled to network 112, which in turn may be operatively coupled to supply chain nodes, or sites, 104, 107. Nodes 104, 107 may be configured as standalone nodes or, preferably, as network nodes, wherein each node 104, 107 comprises network servers 105, 108 and terminals 106, 109, respectively.

As will be explained in the embodiments discussed below, nodes 104, 107 may be configured as part nodes, supplier nodes, ordering nodes, inventory nodes, manufacturer nodes, and/or any other suitable supply chain node. Each of these nodes may be configured to collect, store, and process relevant supply chain-related data and transmit the SCM data to primary node 101 via network 112. Primary node 101 may further be communicatively coupled to one or more data services 110, 111 which may be associated with governmental, monetary, economic, etc., data services. Services 110, 111 may be third-party services configured to provide general data relating to SCM, such as shipping service data and shipping tracking, interest rate data, tax/tariff data, weather data, trade data, currency exchange data, and the like. Further, primary node 101 may be "spread" across multiple nodes, rather than comprising a single node, may access data at any one or more of a plurality of layers from nodes 104, 107, and may be capable of applying a selectable one or more algorithms, applications, calculations, or reporting, as discussed throughout, in relation to any one or more data layers from nodes 104, 107.

Figure 2:
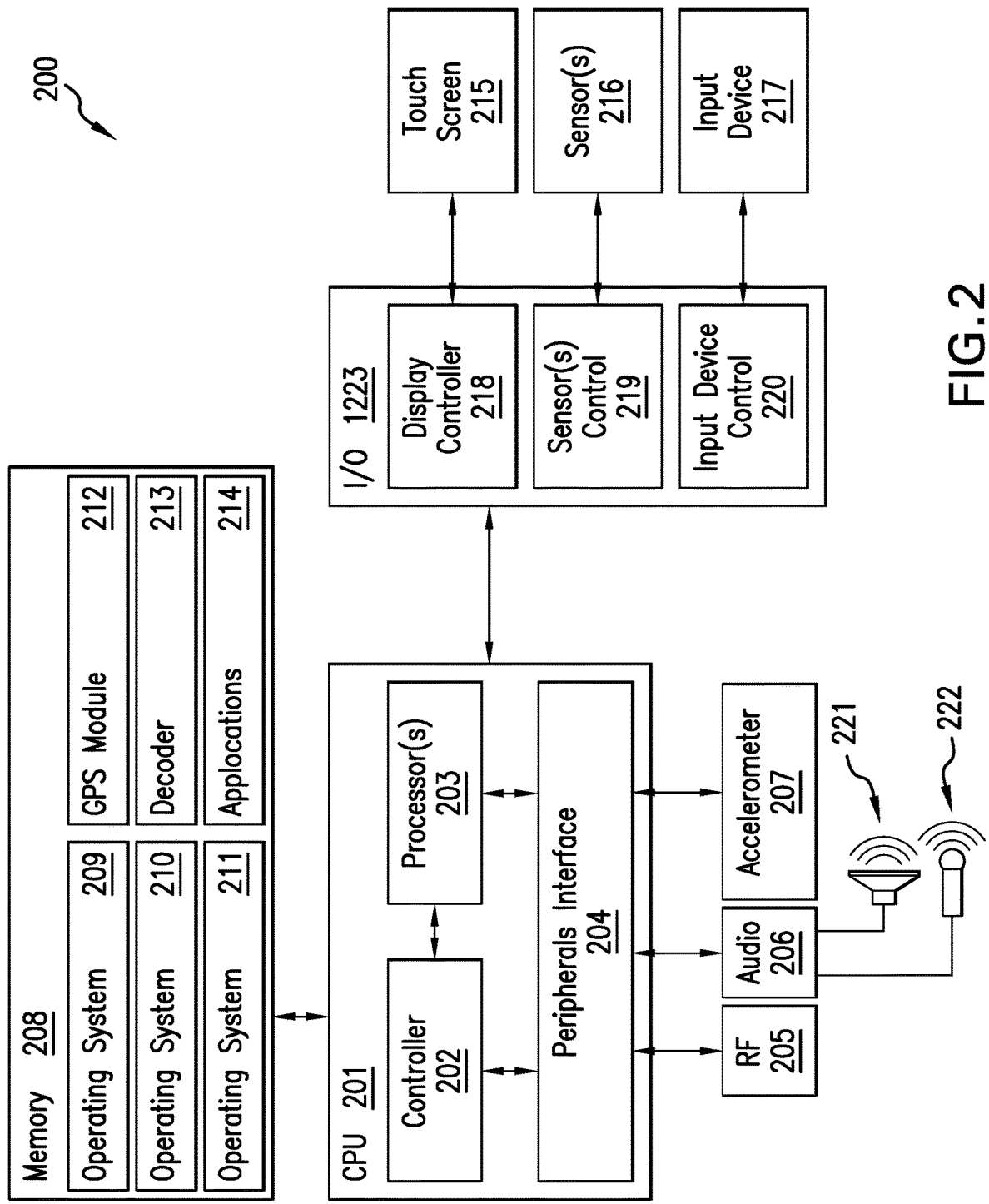
FIG. 2 illustrates an exemplary processing device suitable for use in the embodiment of FIG. 1 for processing and presenting SCM data.

FIG. 2 is an exemplary embodiment of a computing device 200 which may function as a computer terminal (e.g., 103), and may be a desktop computer, laptop, tablet computer, smart phone, or the like. Actual devices may include greater or fewer components and/or modules than those explicitly depicted in FIG. 2. Device 200 may include a central processing unit (CPU) 201 (which may include one or more computer readable storage mediums), a memory controller 202, one or more processors 203, a peripherals interface 1204, RF circuitry 205, audio circuitry 206, a speaker 221, a microphone 222, and an input/output (I/O) subsystem 223 having display controller 218, control circuitry for one or more sensors 216 and input device control 214. These components may communicate over one or more communication buses or signal lines in device 200. It should be appreciated that device 200 is only one example of a multifunction device 200, and that device 200 may have more or fewer components than shown, may combine two or more components, or a may have a different configuration or arrangement of the components. The various components shown in FIG. 2 may be implemented in hardware or a combination of hardware and tangibly-embodied, non-transitory software, including one or more signal processing and/or application specific integrated circuits.

Data communication with device 200 may occur via a direct wired link or data communication through wireless, such as RF, interface 205, or through any other data interface allowing for the receipt of data in digital form. Decoder 213 is capable of providing data decoding or transcoding capabilities for received media, and may also be enabled to provide encoding capabilities as well, depending on the needs of the designer. Memory 208 may also include high-speed random access memory (RAM) and may also include non-volatile memory, such as one or more magnetic disk storage devices, flash memory devices, or other non-volatile solid-state memory devices. Access to memory 208 by other components of the device 200, such as processor 203, decoder 213 and peripherals interface 204, may be controlled by the memory controller 202. Peripherals interface 204 couples the input and output peripherals of the device to the processor 203 and memory 208. The one or more processors 203 run or execute various software programs, algorithms and/or sets of instructions stored in memory 208 to perform various functions for the device 200, such as processing data, including SCM data, in accordance with the algorithms discussed herein throughout. In some embodiments, the peripherals interface 204, processor(s) 203, decoder 213 and memory controller 202 may be implemented on a single chip, such as a chip 201. In some other embodiments, they may be implemented on separate chips.

The RF (radio frequency) circuitry 205 receives and sends RF signals, also known as electromagnetic signals. The RF circuitry 205 converts electrical signals to/from electromagnetic signals and communicates with communications networks and other communications devices via the electromagnetic signals. The RF circuitry 205 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 205 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLE, Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 206, speaker 221, and microphone 222 may provide an audio interface between a user and the device 200. Audio circuitry 1206 may receive audio data from the peripherals interface 204, converts the audio data to an electrical signal, and transmits the electrical signal to speaker 221. The speaker 221 converts the electrical signal to human-audible sound waves. Audio circuitry 206 also receives electrical signals converted by the microphone 221 from sound waves, which may include audio. The audio circuitry 206 converts the electrical signal to audio data and transmits the audio data to the peripherals interface 204 for processing. Audio data may be retrieved from and/or transmitted to memory 208 and/or the RF circuitry 205 by peripherals interface 204. In some embodiments, audio circuitry 206 also includes a headset jack for providing an interface between the audio circuitry 206 and removable audio input/output peripherals, such as output-only headphones or a headset with both output (e.g., a headphone for one or both ears) and input (e.g., a microphone).

I/O subsystem 223 couples input/output peripherals on the device 200, such as touch screen 215 and other input/control devices 217, to the peripherals interface 204. The I/O subsystem 223 may include a display controller 218 and one or more input controllers 220 for other input or control devices. The one or more input controllers 220 receive/send electrical signals from/to other input or control devices 217. The other input/control devices 217 may include physical buttons (e.g., push buttons, rocker buttons, etc.), dials, slider switches, joysticks, click wheels, and so forth. In some alternate embodiments, input controller(s) 220 may be coupled to any (or none) of the following: a keyboard, infrared port, USB port, and a pointer device such as a mouse, an up/down button for volume control of the speaker 221 and/or the microphone 222. Touch screen 215 may also be used to implement virtual or soft buttons and one or more soft keyboards.

Touch screen 215 provides an input interface and an output interface between the device and a user. The display controller 218 receives and/or sends electrical signals from/to the touch screen 215. Touch screen 215 displays visual output to the user. The visual output may include graphics, text, icons, video, and any combination thereof (collectively termed "graphics"). In some embodiments, some or all of the visual output may correspond to user-interface objects. Touch screen 215 has a touch-sensitive surface, sensor or set of sensors that accepts input from the user based on haptic and/or tactile contact. Touch screen 215 and display controller 218 (along with any associated modules and/or sets of instructions in memory 208) detect contact (and any movement or breaking of the contact) on the touch screen 215 and converts the detected contact into interaction with user-interface objects (e.g., one or more soft keys, icons, web pages or images) that are displayed on the touch screen. In an exemplary embodiment, a point of contact between a touch screen 215 and the user corresponds to a finger of the user. Touch screen 215 may use LCD (liquid crystal display) technology, or LPD (light emitting polymer display) technology, although other display technologies may be used in other embodiments. Touch screen 215 and display controller 218 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 215.

Device 200 may also include one or more sensors 216 such as optical sensors that comprise charge-coupled device (CCD) or complementary metal-oxide semiconductor (CMOS) phototransistors. The optical sensor may capture still images or video, where the sensor is operated in conjunction with touch screen display 215. Device 200 may also include one or more accelerometers 207, which may be operatively coupled to peripherals interface 1204. Alternately, the accelerometer 207 may be coupled to an input controller 214 in the I/O subsystem 211. The accelerometer is preferably configured to output accelerometer data in the x, y, and z axes.

In one embodiment, the software components stored in memory 208 may include an operating system 209, a communication module 210, a text/graphics module 211, a geographic positioning module 212, audio decoder 1213 and applications 214. Operating system 209 (e.g., Darwin, RTXC, LINUX, UNIX, OS X, Windows, or an embedded operating system such as VxWorks) includes various software components and/or drivers for controlling and managing general system tasks (e.g., memory management, storage device control, power management, etc.) and facilitates communication between various hardware and software components. A SCM processing platform may be integrated as part of operating system 209, or all or some of the disclosed portions of SCM processing may occur within the one or more applications 214. Communication module 210 facilitates communication with other devices over one or more external ports and also includes various software components for handling data received by the RF circuitry 205. An external port (e.g., Universal Serial Bus (USB), Firewire, etc.) may be provided and adapted for coupling directly to other devices or indirectly over a network (e.g., the Internet, wireless LAN, etc.).

Text/graphics module 211 includes various known software components for rendering and displaying graphics on a screen and/or touch screen 215, including components for changing the intensity of graphics that are displayed. As used herein, the term "graphics" includes any object that can be displayed to a user, including without limitation text, web pages, icons (such as user-interface objects including soft keys), digital images, videos, animations and the like. Additionally, soft keyboards may be provided for entering text in various applications requiring text input. Geographic positioning module 212 determines the location of the device, such as including in relation other devices or nodes, and provides this information for use in various applications. Applications 214 may include various modules, such as the E&O engine and application discussed throughout.

Supply chains, and particularly those in the field of high-tech manufacturing, can be very complex, and, from a data standpoint may be made up of hundreds of thousands of records, data points, manufactured elements, systems, sub-systems, sub-sub-systems, and so on. Consequently, the disclosed E&O application 214 may comprise a software as a service that enables overall supply chain insight on a node-by-node, system by system, and element-by-element basis.

By way of example, it is typical that a part's inventory on hand or on order for a supplier, reseller, or manufacture may exceed the demand for those parts, at least at a given node. That supplier, reseller, or manufacture may retain these excess and obsolete (E&O) parts in the hopes the parts are necessary to the same or another customer at a later point in time, including at the same or another node. Issues caused by such E&O inventory, and its later use and/or maintenance in inventory, may be further exacerbated by the fact that the definition of E&O may differ as between the supplier, reseller, manufacturer and the customer, as well as between different customers, as discussed throughout.

Accordingly, the disclosed application 214 may include, for example, algorithms whereby pattern recognition may be performed across an entire supply chain, or within aspects thereof or for particular customers thereof, to assess patterns that typically lead to E&O, and/or for solutions to E&O. Once learned, these recognized patterns may be applied to the product or elements and parts of a particular customer, such as upon input from the customer at the inception of a design for supply chain; or across different parts independently for a given customer; or different parts across different customers. These recognized patterns may also be analytically applied to: a newly input product design, such as in order to give a probability ratio that a part or parts within the design may experience E&O; similar products; the same or similar verticals; and/or to any supply chain(s) using the same or similar parts, by way of non-limiting example.

Such pattern recognition, for E&O and other end-to-end aspects of a supply chain, may be performed by the application 214 to include part profiles for various parts, including, in certain embodiments, directly competitive parts. Such profiles may include the location of manufacture, generation or shipping of the parts, the history of inclusion of the parts, and the like. Analytic profiles may additionally include, for example, typical and/or comparative responses from a particular part provider or providers of that part to variations in demand.

In accordance with the foregoing, the disclosed application 214, in addition to the functionality discussed below, may allow for accommodations to be made or charges to be made as a direct result of part consumption that leads to certain outcomes or probabilities of E&O. By way of example, in the known art, a customer may request that a given manufacture order 10,000 of a particular part, but may use only 3000 of those parts in that customer's products. However, also in the known art, to the extent that manufacture orders 500,000 of that same part across multiple ones of its customers, there is presently no known automated manner of apportioning responsibility as between that manufacturer and those different customers for the E&O of those parts with respect to the different customers.

In light of the foregoing, the embodiments provide an excess and obsolete ("E&O") application 214, which may take the form of a software engine to provide a tracking engine and system, that allows for variable entry of the definitions of, apportioning of, and tracking of E&O on a customer-by-customer, project by project, and part by part basis. For example, a first customer may classify any parts on hand that exceed the 90 day demand for those parts as excess parts, and any parts inventory for which there is no demand on a 120 day horizon as obsolete. On the other hand, a second customer may classify any parts for which there is no demand on a 120 day horizon to be excess, and any parts for which there is no demand for 270 days as obsolete.

In the foregoing example, the embodiments of the E&O tracking engine may enable a drill-down, such as through the disclosed exemplary graphical user interface (GUI), by each customer, by each part, by each material, by each timeframe, by definition, by time horizon (day, month, quarter, year, and so on), and the like. As such, the engine may independently track each customer's excess and obsoletion on a part by part basis, at 90 days and 120 days for customer 1; and at 120 days and 270 days for customer 2. Moreover, the engine and system 214 may preferably enable the tracking of parts and materials by all identifying information, namely by customer part number, provider part number, contract manufacturer part number, searching by full or partial part description, and so on, for each customer independently.

The embodiments may enable the use of all of the foregoing information to track parts and materials inventory using embedded analytics tools, such as using a demand curve versus an inventory curve, etc., to allow for development of claims to be made against a contract for excess and obsolete parts on a part-by-part, and customer-by-customer, basis. Moreover, the disclosed excess and obsolete engine and application 214 may allow for partial or full exclusions of such claims, such as to enable improved customer service, which exclusions may require administrative permissions from any of various user levels, which permissions may vary from customer-to-customer and/or from user-to-use.

Yet further, the disclosed E&O engine 214 may further allow for drill-downs on a part by part, provider by provider, customer by customer, or similar basis, which drill-down may uniquely indicate features by different providers/suppliers and/or prospective remedial actions to E&O, such as parts and materials that can be returned, cannot be returned, that can be reused for the same customer or a different customer (such as may indicate the initial customer may be provided with a partial payment credit), or which can be used elsewhere, such as a substitute part for the same or a different customer at a different node.

The disclosed E&O engine 214 may provide security in communications for the contract manufacturer, such as by varying customers and suppliers visible on a user-by-user basis, and may provide unique and independent verification tools for a contract manufacturer to provide verified claims regarding E&O claim to individual customers. This avoids the difficulty in the known art in which a contract manufacturer often won't make a claim to a customer absent 100% certainty that the claim is correct, in part to avoid bad feelings on the part of the customer towards the contract manufacturer.

Figure 3:
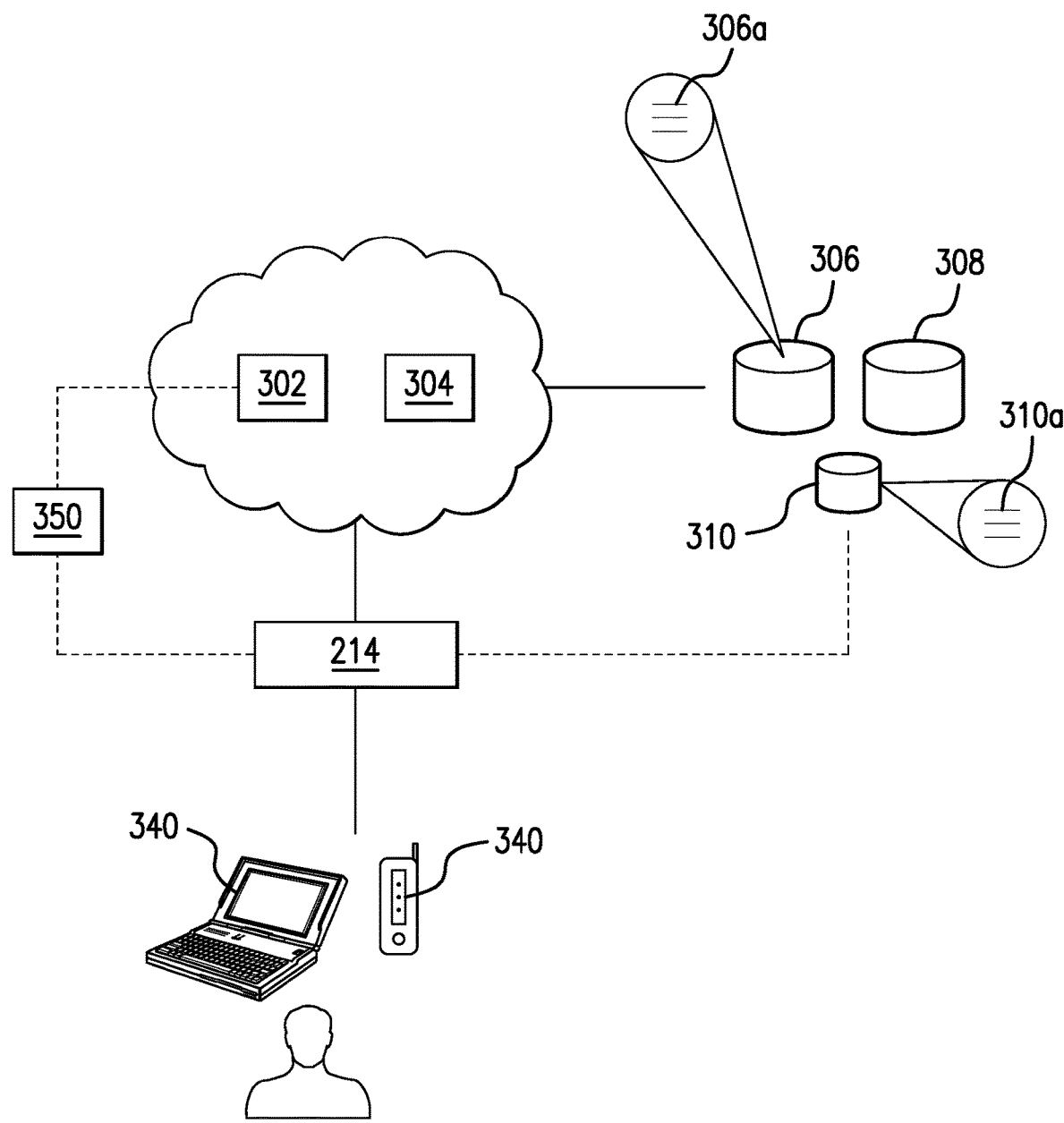
FIG. 3 illustrates a block diagram of an excess and obsolete engine/application.

FIG. 3 illustrates a block diagram of an E&O engine 214 in accordance with ones of the embodiments. As shown, the E&O engine 214 may include one or more rule sets 302, 304 having access and applicability to one or more customer databases 306, 308, 310 which are hierarchically partitioned by customer identifier (and/or by user, administrator, customer vertical, supplier, etc.) 306a. The exemplary customer identifier 306a may be numeric, alphabetic, or alphanumeric, and may or may not be searchable in whole or in part.

The assessment of a customer identifier 306a in the gateway customer database 306 provides secured data access 312, by any one or more known data security methodologies, to at least two customer-specific databases 308, 310—a first database 308 housing the contract terms 320 of the agreement between the contract manufacturer and that customer 306a; and a second 310 housing the parts and materials 330, with all associated identifiers, for the manufactured item or items under contract with that particular customer 306a. Of course, the skilled artisan will appreciate, in light of the discussion herein, that a single or multiple relational or like data division units may be employed in the embodiments within the scope of the disclosure, and, as such, that the three database 306, 308, 310 format discussed herein is provided by way of example and to provide simplicity of discussion.

Access to the foregoing databases 306, 308, 310 through the disclosed GUI may be subjected to the aforementioned rule sets 302, 304. That is, the making of a claim through the GUI may not only be subjected to the contract term, part identifier, and customer identifier limitations, but may be additionally subjected to rule sets generic to all or some customers, and/or rule sets specific to the particular selected customer 306a. Such rule sets 302, 304 may include, by way of non-limiting example: required administrative oversight, such as the in the event a user requests into the GUI 340 the waiver/exclusion of an E&O claim, which waiver request must be subjected to certain administrative permissions; minimum requirements, such as that no item may be considered excess until it is 5 business days from having been subjected to ordering, for example; maximum requirements, such as that no item may be considered anything other than obsolete if it is inventoried for more than 500 days, for example; and so on.

Thus, at the outset, a customer may be inputted into the customer database 308, such as to the GUI 340. Once the customer 306a is input, the GUI 340 may allow for entry of the customer's contract terms, such as via manually inputting such terms or by uploading a manufacturing contract that is reviewed, either manually or using an artificial intelligence engine 350 associated with or forming part of the E&O engine 214 (which may, for example, ask a user of the GUI whether the AI's interpretation of the contract is correct); and the uploading of, or discerning by the AI of, a parts and materials list related to the contracted manufacturing. More particularly, the AI engine 350 may be applied by rule sets 302, 304, by way of example.

The GUI 340 may additionally include menus regarding the making of claims, as well as data interpretation tools provided by the aforementioned rule sets, such as waterfall charts, demand curves, inventory, curves, and the like, as discussed and shown throughout, and these menus and accessible features may vary based on the current user of the GUI 340. For example, the GUI 340 may additionally allow for entry or uploading of typical "account" features known to those skilled in the art. For example, a contract manufacturer user of the GUI 350 may provide an account by uploading certain information or answering a series of questions, and a customer account may be created by similarly uploading information or answering a series of questions. Moreover, the rule sets 302, 304 may indicate a series of questions to be posed to a user, such as in the event of a prospective E&O claim, in the event of account creation, or in the event of an IT issue, such as: a request for uploading of information indicative of an E&O issue, by way of non-limiting example; a request for a general description of the issue; an ability to attach files; relevant dates and times; password entry and verification; and so on.

Figure 4:
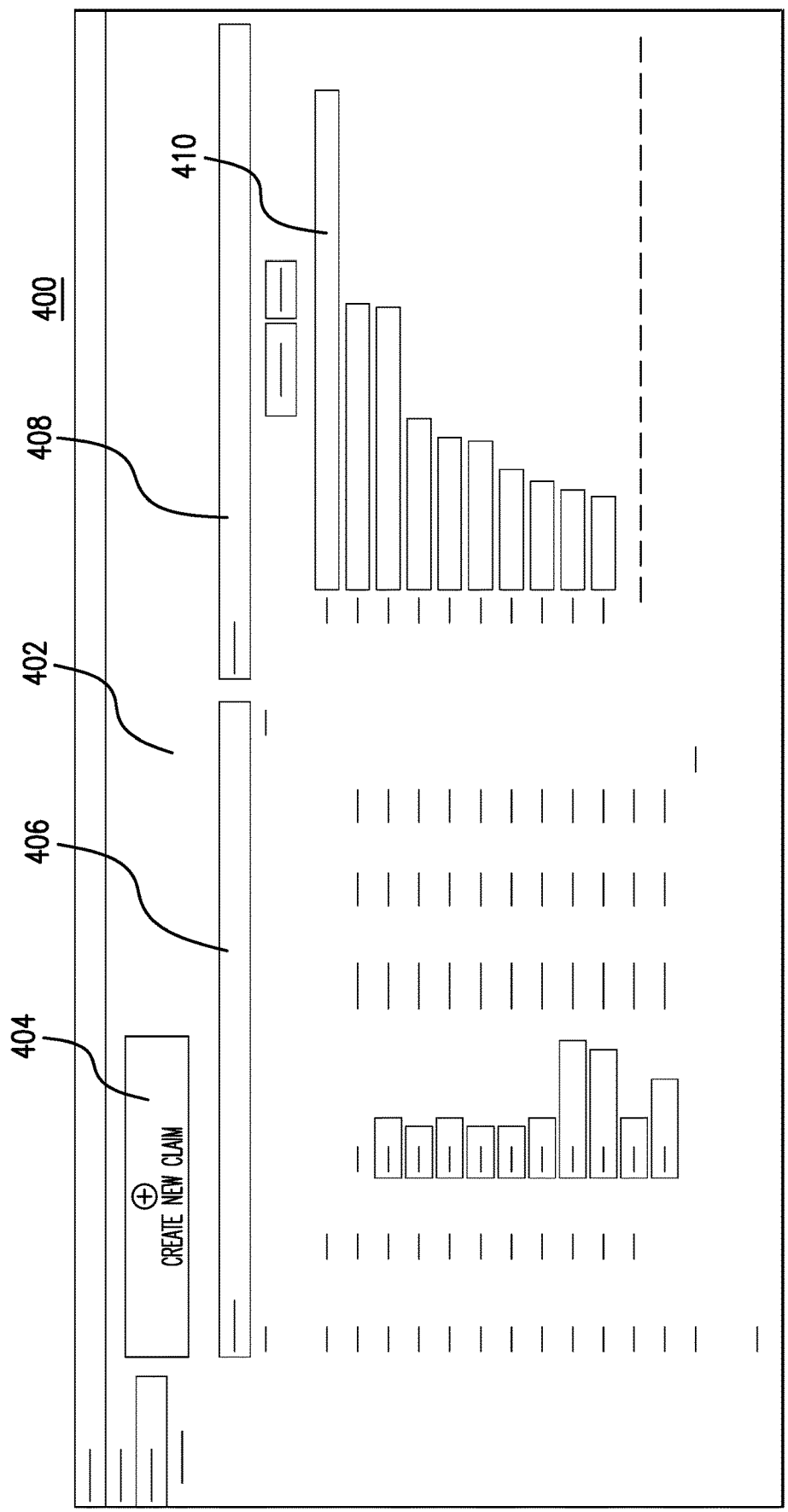
FIG. 4 illustrates an exemplary GUI.

FIG. 4 is a screen shot 400 illustrating an E&O claims window 402 for a particular customer, as presented to a user of the GUI 350 that forms part of the E&O engine 214 detailed above. As shown, in the illustrated claims summary window 400 a user may create a claim 404; see claims already in process 406; be provided with indications of parts that may be subjectable to a claim 408; perform available data analysis, such as to understand major contributors to E&O for the given customer 410; and so on.

Of additional note, the claims summary section 400 may be a drill-down that subjects the claims summary 400 to limitation to a particular customer, but which may begin at a higher hierarchical level with a list of all claims (such as both prospective and in process) for all customers or for a particular subset of customers, such as customers in a particular industry vertical or customers visible based on the account-access of a current GUI user. The claim summary 400 may be provided as a grid that contains information about the claims, such as the date the claim was created, the workflow status of the claim, the particular customer, a part descriptor of the claim, a manufacturing plant relevant to the claim, and the inventory location for the claimed part, a total or partial claimable value, and the like, for example.

Figures 5A, 5B:
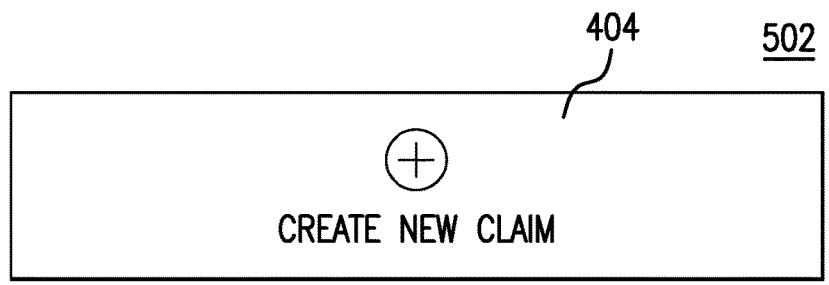
FIG. 5A illustrates an exemplary GUI.
FIG. 5B illustrates an exemplary GUI.

FIGS. 5A and 5B illustrate with particularity a GUI window 502 for the creation of an E&O claim. FIG. 5A illustrates the actuation of a "create new claim" actuatable element 404 from within an initial and/or hierarchically higher level access screen of the GUI 502. FIG. 5B illustrates the choosing of a customer 502a with which the claim will be created. Of note, the available customer hierarchy available for screen 502 may be filtered in accordance with the customers serviced by, or other relevant criteria to, the current user, such as based on that user's login.

Figure 6A:
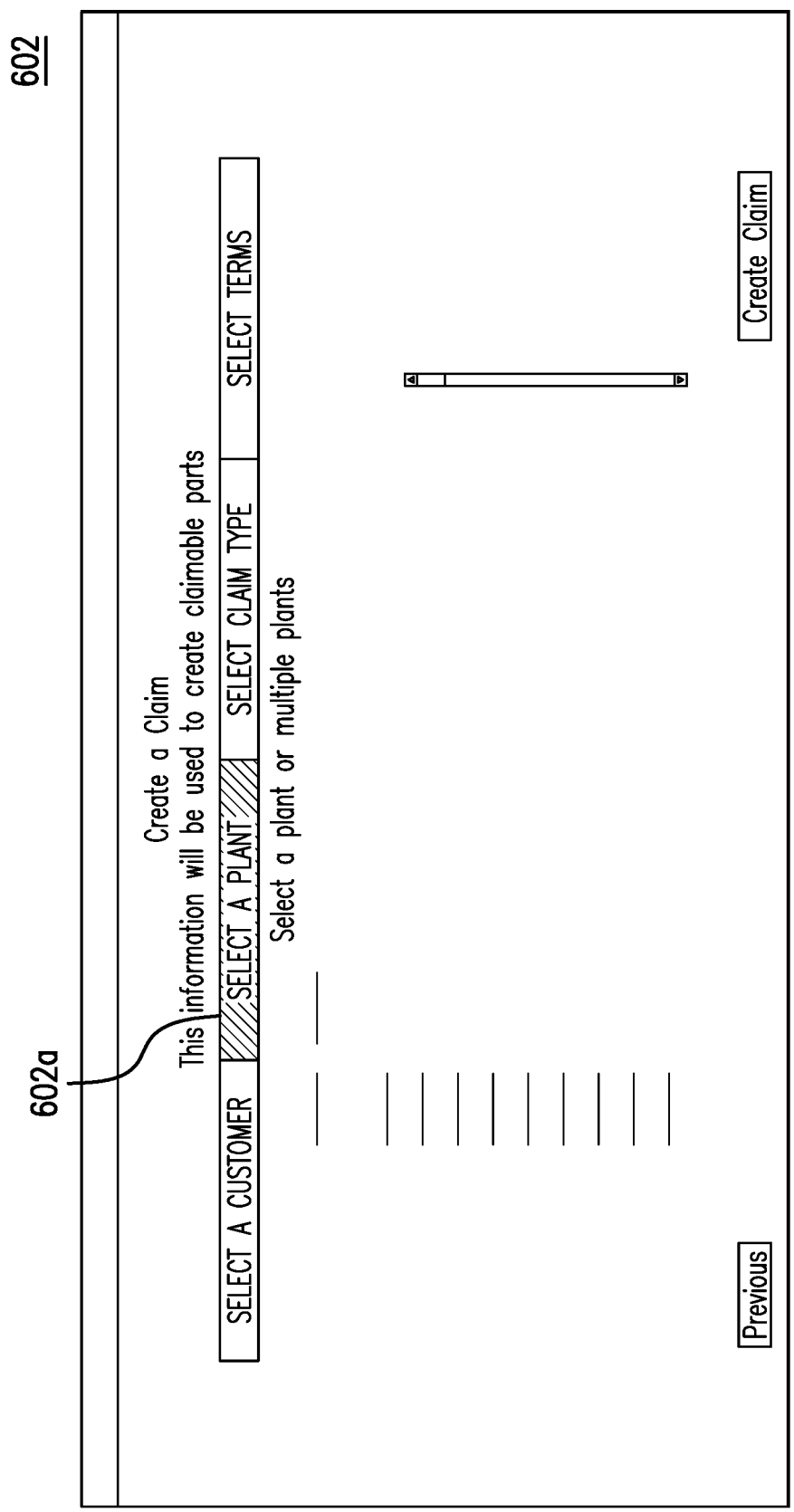
FIG. 6A illustrates an exemplary GUI.
Figure 6B:
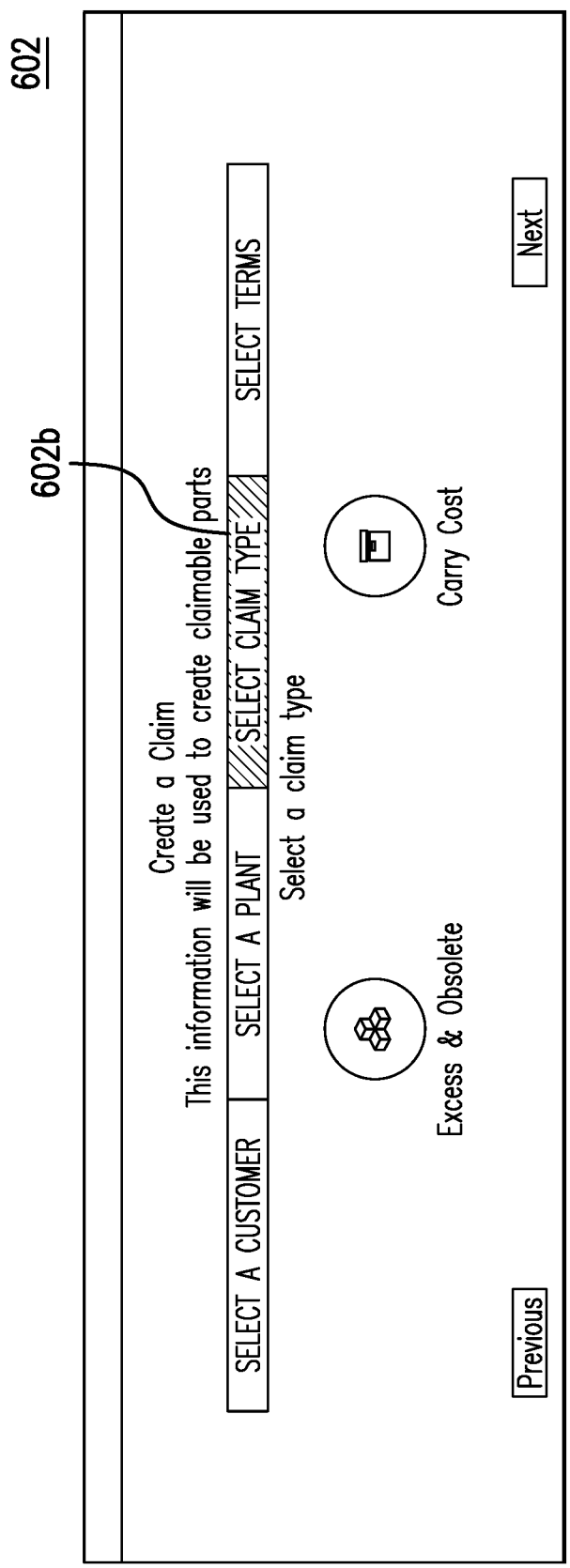
FIG. 6B illustrates an exemplary GUI.

FIG. 6 additionally illustrates a window or aspect 602 for the choosing of a site/node (or sites/nodes) that is relevant to a particular claim 602a, and choosing a claim type 602b. By way of non-limiting example, the choices made in FIGS. 5 and 6 and may be related to various types and locations of claims, including but not limited to excess, obsolete, delivery cost, and carrying cost claims. More specifically, in the course of drilling down through the GUIs of FIGS. 5 and 6, the E&O engine 214 may additionally generate a list of parts and materials that may be classified in accordance with the selected definitions/types/locations/inventories/customer.

Figure 7:
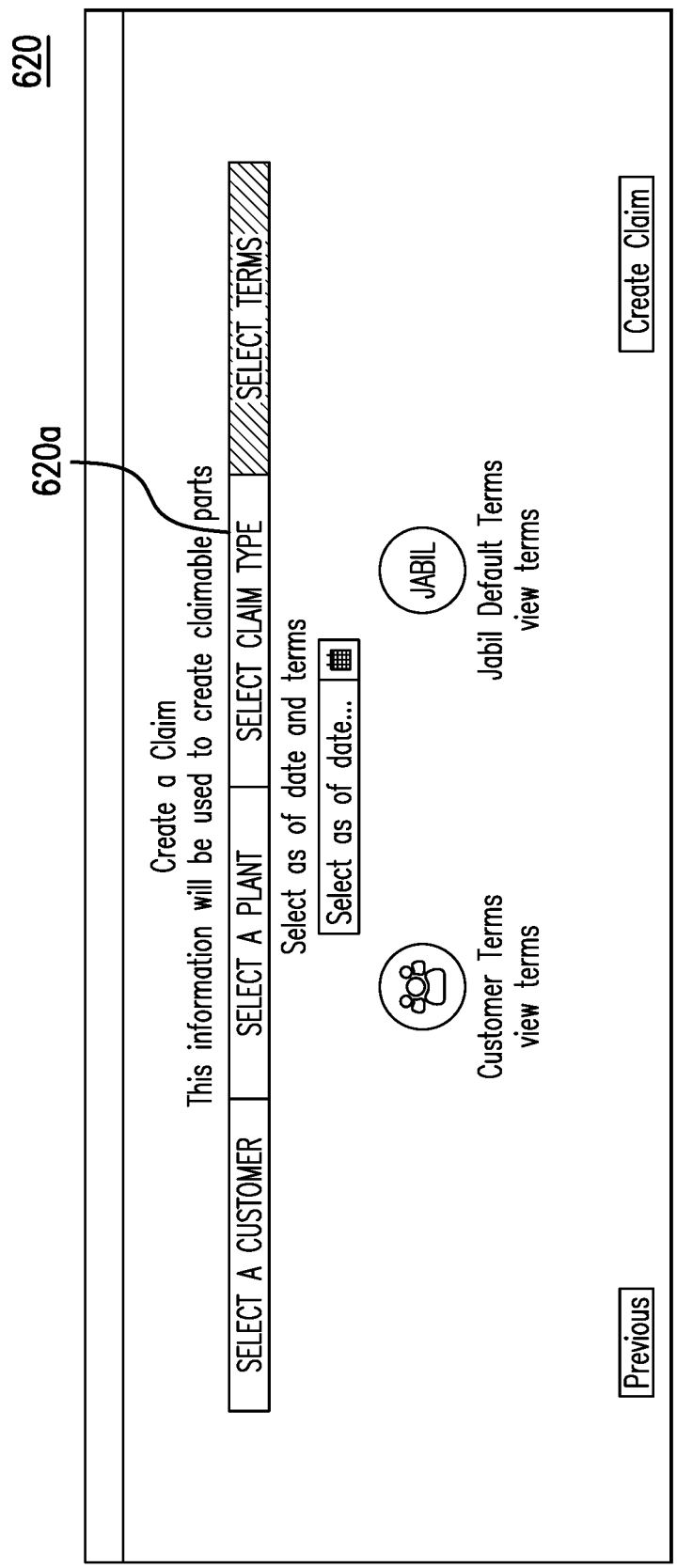
FIG. 7 illustrates an exemplary GUI.

FIG. 7 allows for selection of a date or date range in window 620. This date window 620 may allow for selection of a particular date, such as for application of a contract having that date as the definition for excess or obsolete, by way of example, or may allow for selection of a date range 620a over which data or data analytics may be displayed to the user. Of note, the rules sets 302, 304 mentioned in relation to FIG. 3 may additionally include application of generic rules, such as "standard" definition of excess and obsolete, that may be applied by the E&O engine 214 automatically in the event the uploaded contract or contract terms do not include, or the afore-discussed AI cannot discern, such definitions, and may additionally include the data or data analytics options available to the user for given date ranges, by way of example.

FIGS. 8A and 8B illustrates a claim summary and details grid window 702 that may be accessible to the user by one or more of the GUI interfaces referenced throughout, and which may hyperlink to a variety of information discussed throughout and shown at a top level in grid 702. The claim details grid 702 may provide summary information regarding a claim or prospective claim, and may additionally provide the summary data in a hyper-linked format that allows a user to drill-down, such as by clicking on particular numbers or definitions, deeper into that one or into other ones of the databases discussed with respect to FIG. 3. Moreover, prior to or during a drill-down, prospective claimable parts or claimed parts may be filtered or searched, such as by number, letter, alphanumeric code, or the like, as shown in the GUI screens 802 of FIGS. 9A and 9B.

Figure 10A:
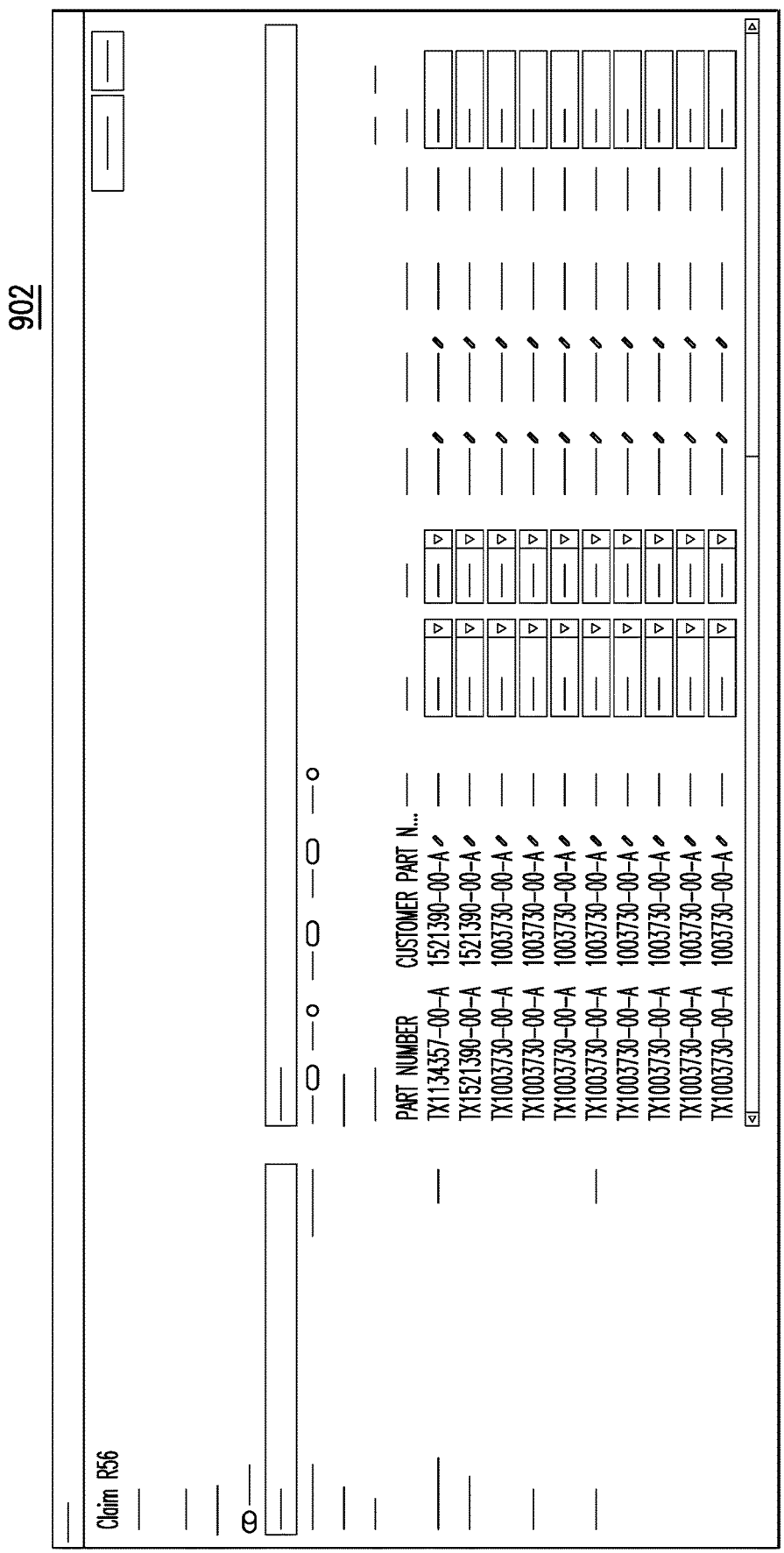
FIG. 10A illustrates an exemplary GUI.
Figure 10B:
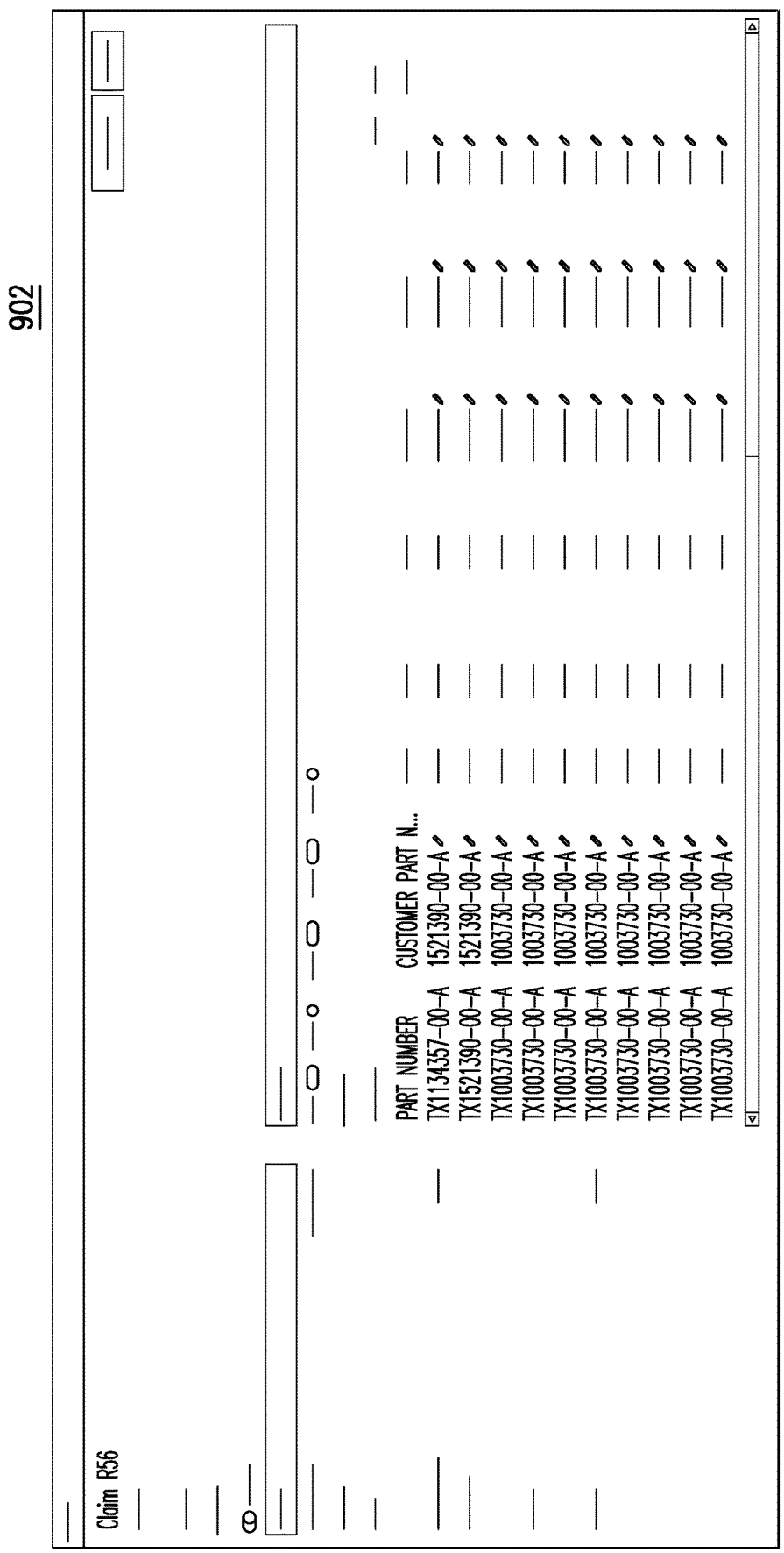
FIG. 10B illustrates an exemplary GUI.
Figure 10C:
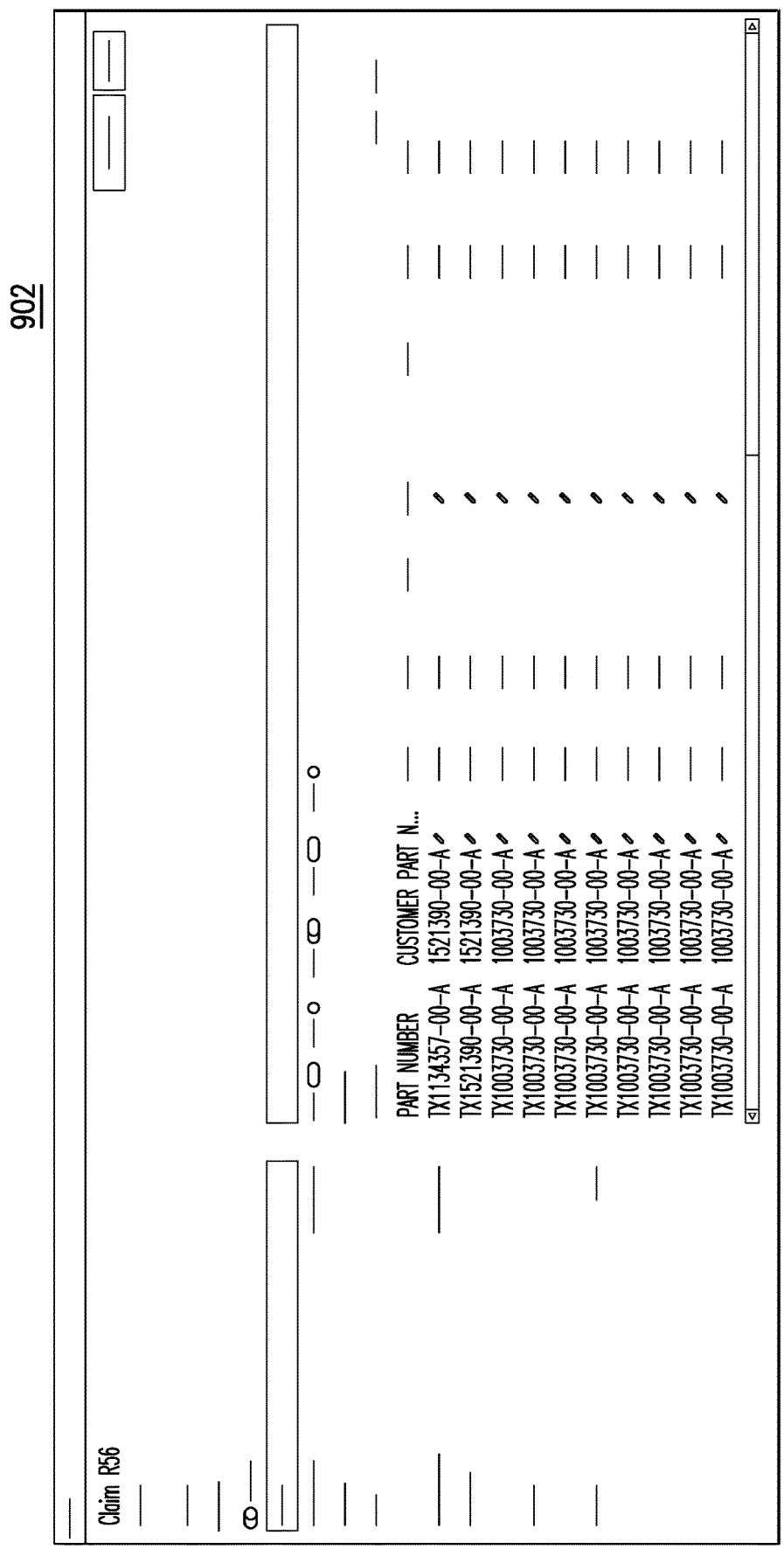
FIG. 10C illustrates an exemplary GUI.

FIGS. 10A, 10B, and 10C illustrate a detailed claimable parts GUI 902. In the illustrations, details are provided regarding each part that qualifies or which may qualify for a claim, such as may be based on the parameters chosen in the previously-discussed aspects of the GUI. Of note, various different indicators may be included for each part, such as a customer part number and a contract manufacturer's part number. Additionally, aging days may be a defined term or a variable term—for example, the rule set(s) mentioned in relation to FIG. 3 may apply a first in, first out rule for aging days, although this definition may be modified to the extent the term is defined in a specific customer's contract.

Of further note, the GUIs 902 of FIG. 10 may allow for modifications, or suggested modifications, to parts and materials ordering that might, if not executed by the user, lead to continued or exacerbated inefficiencies in the contract manufacturing process. By way of example, if the inventory on hand exceeds the inventory on order, and the inventory on order may be subject to a return for a refund, the GUI may suggest to the user that the user may execute a return of the inventory on order and instead use the inventory on hand. Further present within the GUIs of FIG. 10 may be information from the provider of parts and materials, such as minimum order increments, delivery lead times, cancellation lead times, and the like.

Figure 11A:
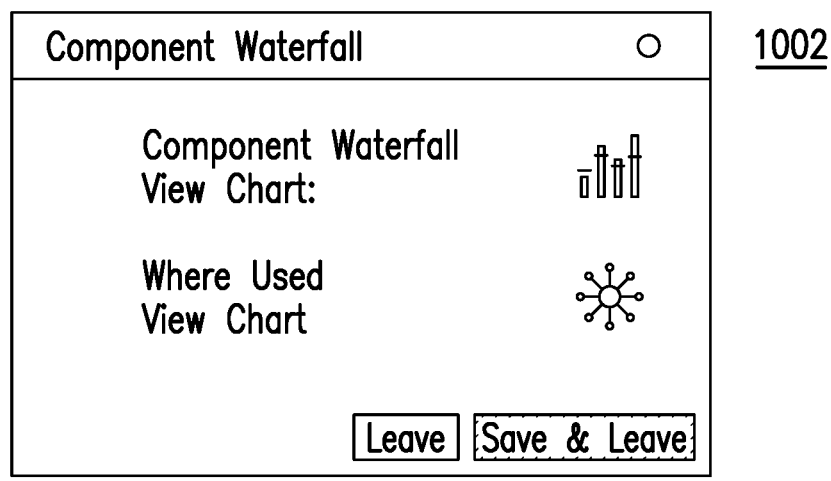
FIG. 11A illustrates an exemplary GUI.
Figure 11B:
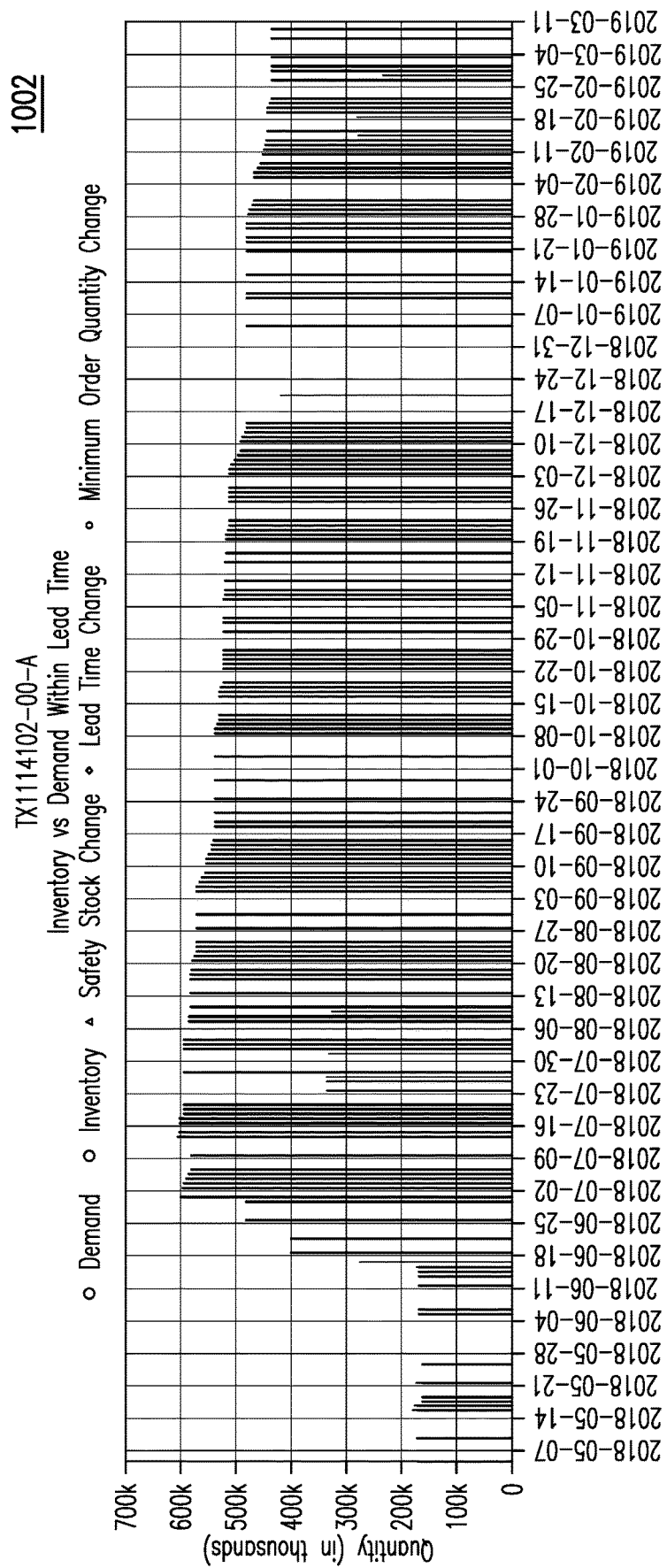
FIG. 11B illustrates an exemplary GUI.

FIGS. 11A and 11B illustrate windows 1002 for the generation of exemplary data analytics, pursuant to a GUI user request, and such as may be included in support of the making of a claim. As shown in FIG. 11A, various charts may be associated with the data described in FIG. 10. For example, and as illustrated in FIG. 11B, a waterfall chart may show inventory versus demand over time. In the illustration, ones of the bars represent demand, and the darker bar represents inventory over time during the selected snapshot dates (shown along the X axis). In short, the chart of FIG. 11B is illustrative of when demand has dropped below inventory levels, thereby, based on customer definitions, possibly indicating that the part shown in the grid has become excess.

Figure 12:
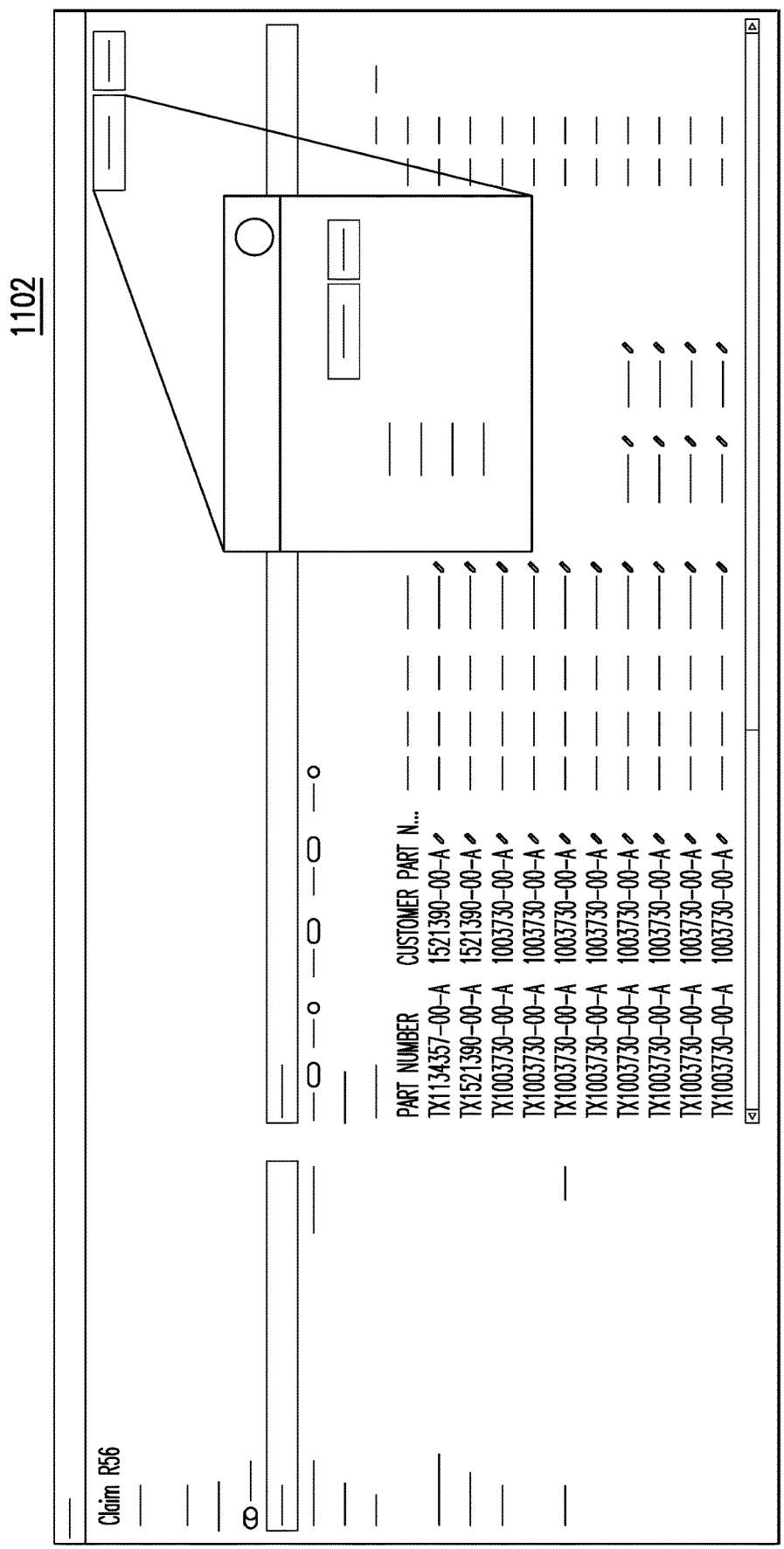
FIG. 12 illustrates an exemplary GUI.

FIG. 12 shows a GUI 1102 providing the aforementioned feature in which a developed claim may be routed to another user, such as for administrative purposes. Furthermore, the history of the claim may be tracked by this screen 1102, such as including when the claim was forwarded for administrative review, and any preset required timeframes for completion of the administrative review.

Figure 13:
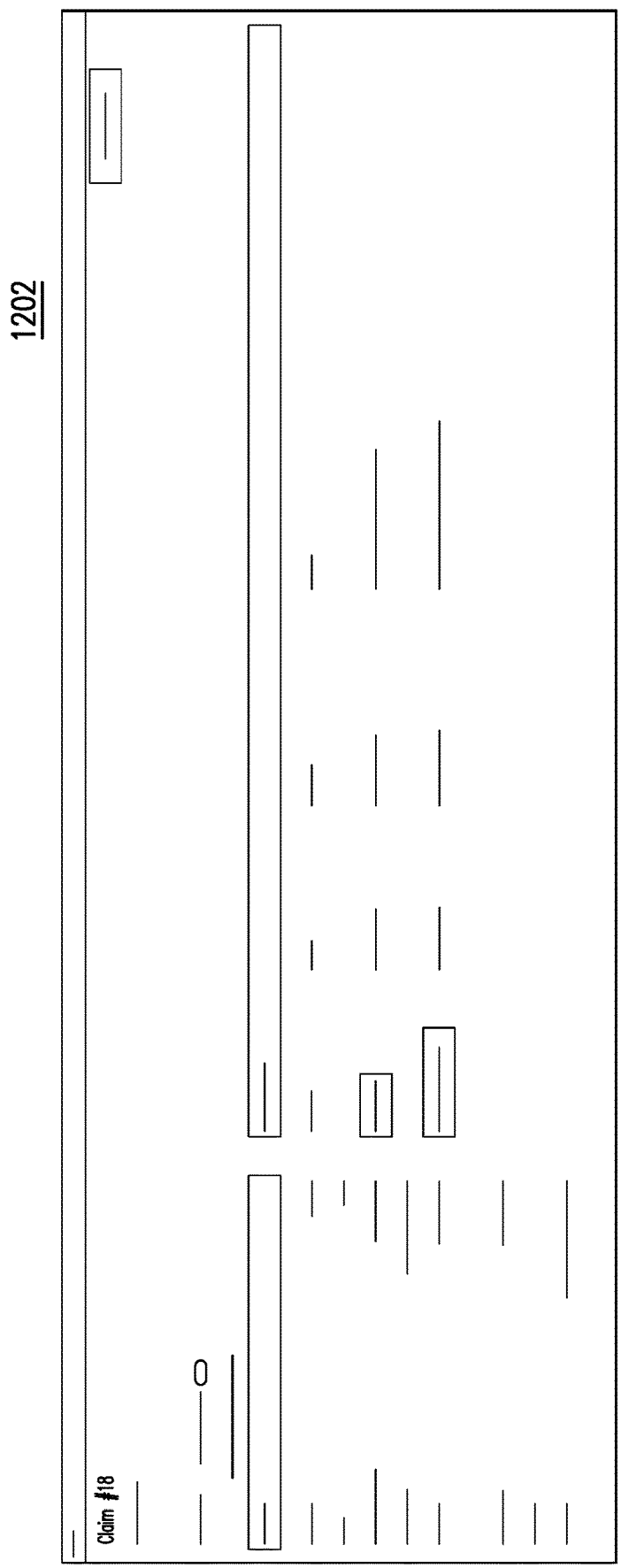
FIG. 13 illustrates and exemplary GUI.

Claim history may further include any of a variety of basic information or options regarding a given claim or prospective claim. This is illustrated in the GUI 1202 of FIG. 13. As is also illustrated in FIG. 13, the status of the claim may be tracked in its history. By way of example, a draft claim may indicate that a claim has been created for the first time, or that an administrative user has sent the claim back to the creator for modification. A claim that is ready for approval may indicate that a claim is ready for administrative finalization by the contract manufacturer. A claim that is ready for customer review may be sufficiently vetted administratively to be provided to a customer, and a claim that is pending approval may be pending with a customer for approval of and payment of subject claim. Of course, additional statuses may include return from customer for further review, accepted by customer for payment, closed for any of a variety of reasons, or deleted or withdrawn.

The algorithms within the engine 214, as discussed throughout, may also perform and/or allow for simulations, such as those provided to a comparator within the analytics engine 214, that may simulate the outcome of recommended modifications to the supply chain as compared to an unmodified supply chain (as may be input by the user). Such simulated effects on a supply chain may be provided to the user as a snapshot of a one-time modification, or may be supplied to the user over a given horizon, such as the effect of a recommended modification to the supply chain over a six-month horizon.

Needless to say, numerous variables may be available to the user for changing by the user in a given manually-requested simulation (simulations may also be automated by the analytics engine), and the user may toggle those variables in real time and receive a modified simulated output. By way of non-limiting example, variables may include service level (whether or not part delivery target dates are hit), inventory levels, days of supply, end of life proximity (as may be estimated across many data sets of similar parts), contractual excess horizon, obsolete contractual horizon, and the like. The user may then modify any of these variables and be provided with a simulated outcome of that modification, or the user may modify a different part metric and be able to see the effect of that modification on one or more of the foregoing variables. Such simulations may further include predictive modeling.

The exemplary embodiments discussed herein, by virtue of the processing and networked nature of the disclosed platform and associated applications, may provide typical data services in conjunction with the specific features discussed herein. By way of non-limiting example, reports may be made available, such as for download, and data outputs in various formats/file types, and using various visualizations, may be available. Moreover, certain of the aspects discussed herein may be modified in mobile-device based embodiments, such as to ease processing needs and/or to fit modified displays.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A customizable supply chain management system for a particular user comprising:
   one or more hardware servers comprising:
      at least one rule set comprising a rule set specific to the particular user;
      a gateway customer database comprising distinct customers identifiers associated with respective distinct customers including a first distinct customer, wherein data of the gateway customer database is relational;
      a first database comprising a plurality of full parts and materials lists for respective manufactured products associated with at least one of the customer identifiers;
      a second database comprising definitions from a contract for each of the respective manufactured products and each of the respective distinct customers regarding when one from the plurality of the full parts and the materials becomes excess, and when one from the plurality of the full parts and the materials becomes obsolete, for a manufactured product of the respective manufactured products;
         wherein the definitions include a definition for the contract for the first distinct customer;
         wherein the gateway customer database provides secure access to the first and second databases:
      a learning module that learns and recognizes patterns in a plurality of full parts from the plurality of the full parts and materials lists based on input from the first distinct customer and other customers, wherein the learning module allows for a modification of the definition to provide a modified definition of obsoletion and excess according to the learned and recognized patterns, and automatically converts a demand versus inventory curve to a claim for excess or obsoletion before criteria meeting the modified definition is met; and at least one terminal comprising:

a graphical user interface (GUI) that provides access to details of at least the respective manufactured products, a full parts and materials list, and the modified definition, such that a choice between the claim for excess or obsoletion or a curative measure may be made through the GUI against at least one of the full parts or at least one of the materials in accordance with a direction from a user of the GUI;

wherein a limited view of distinct customers associated with the distinct customer identifiers is shown to the particular user based on the rule set specific to the particular user.

2. The application of claim 1, wherein the curative measure comprises use of an excess of obsolete part on behalf of the first distinct customer in a different one of the respective manufactured products.

3. The application of claim 1, wherein the curative measure comprises use of an excess of obsolete part on behalf of a second customer in a different one of the respective manufactured products.

4. The application of claim 1, wherein ones of the respective manufactured products viewable in the GUI are varied by the at least one rule set based on a current user.

5. The application of claim 1, wherein the at least one rule set allows for exclusions of the claim, in whole or in part, according to a current user.

6. The application of claim 1, wherein access to the GUI is account-based.

7. The application of claim 1, further comprising a link to at least one inventory management system, wherein the link provides an automated assessment of a meeting of the modified definition.

8. The application of claim 1, further comprising a link to a parts and materials ordering system, wherein the full parts and materials ordering system is capable of providing data regarding a meeting of the modified definition.

9. The application of claim 8, wherein the data includes at least an order date.

10. The application of claim 8, wherein the data includes at least return and refund terms.

11. The application of claim 1, wherein the at least one rule set comprises rules generic to all of the distinct customers.

12. The application of claim 1, wherein the at least one rule set comprises rules generic to all of the manufactured products.

13. The application of claim 1, wherein the at least one rule set comprises administrative permissions.

14. The application of claim 1, wherein the definition is manually input to the GUI.

15. The application of claim 1, wherein the definition is automatically input to the GUI.

16. The application of claim 15, wherein the automatic input comprises an artificial intelligence.

17. The application of claim 1, wherein the GUI further provides an embedded analytics tool capable of tracking at least a need for and inventory of the full parts and the materials.

18. The application of claim 17, wherein the embedded analytics tool comprises at least pattern recognition.

* * * * *